United States Patent
O'Rourke et al.

(10) Patent No.: US 8,150,951 B2
(45) Date of Patent: Apr. 3, 2012

(54) SYSTEM AND METHOD FOR COMMUNICATING IN A LOADBALANCING ENVIRONMENT

(75) Inventors: Chris O'Rourke, Apex, NC (US);
Robert M. Batz, Raleigh, NC (US);
Rabih A. Dabboussi, Cary, NC (US);
John M. Glotzer, Chapel Hill, NC (US);
Louis F. Menditto, Raleigh, NC (US);
Alpesh S. Patel, Santa Clara, CA (US);
Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 973 days.

(21) Appl. No.: 10/192,919

(22) Filed: Jul. 10, 2002

(65) Prior Publication Data

US 2005/0188065 A1 Aug. 25, 2005

(51) Int. Cl.
*G06F 15/173* (2006.01)
(52) U.S. Cl. .................................................. 709/223
(58) Field of Classification Search .......... 709/213, 709/223, 238, 226, 229; 718/105; 370/229, 370/328, 352, 329, 338
See application file for complete search history.

(56) References Cited

U.S. PATENT DOCUMENTS

| | | | |
|---|---|---|---|
| 4,633,387 A * | 12/1986 | Hartung et al. | 718/105 |
| 5,185,860 A | 2/1993 | Wu | 395/200 |
| 5,479,404 A | 12/1995 | Francois et al. | 370/84 |
| 5,490,252 A | 2/1996 | Macera et al. | 395/200.01 |
| 5,651,007 A | 7/1997 | Warren et al. | 370/431 |
| 5,754,830 A * | 5/1998 | Butts et al. | 719/311 |
| 5,905,736 A | 5/1999 | Ronen et al. | 370/546 |
| 5,931,961 A | 8/1999 | Ranganathan et al. | 714/712 |
| 5,956,391 A | 9/1999 | Melen et al. | 379/114 |
| 5,970,477 A | 10/1999 | Roden | 705/32 |
| 6,047,051 A | 4/2000 | Ginzboorg et al. | 379/130 |
| 6,061,650 A * | 5/2000 | Malkin et al. | 704/228 |
| 6,377,982 B1 * | 4/2002 | Rai et al. | 709/217 |
| 6,393,458 B1 | 5/2002 | Gigliotti et al. | 709/203 |
| 6,434,618 B1 | 8/2002 | Cohen et al. | 709/228 |
| 6,442,165 B1 | 8/2002 | Sitaraman et al. | 370/395.4 |
| 6,473,802 B2 | 10/2002 | Masters | 709/229 |

(Continued)

FOREIGN PATENT DOCUMENTS

EP 1 134 991 A2 9/2001

(Continued)

OTHER PUBLICATIONS

Canadian Intellectual Property Office letter to Gowling LaFleur Henderson LLP regarding Office Action for Canadian Patent Application No. 2,490,689 dated Oct. 16, 2008, forwarded by foreign associate to Baker Botts on Jan. 7, 2009, 3 pages.

(Continued)

*Primary Examiner* — John MacIlwinen
(74) *Attorney, Agent, or Firm* — Baker Botts L.L.P.

(57) ABSTRACT

A method for communicating in a loadbalancing environment is provided that in a particular embodiment includes receiving a request packet from a network access server (NAS) to initiate a communication session. The request packet is then communicated to a tunneling protocol network server (TPNS) and a response packet is received in response to the request packet. The response packet establishes a tunnel that facilitates the communication session and that includes an identification element associated with the TPNS such that a data transfer associated with the communication session is executed between the NAS and the TPNS.

17 Claims, 2 Drawing Sheets

U.S. PATENT DOCUMENTS

| | | | |
|---|---|---|---|
| 6,484,143 B1 | 11/2002 | Swildens et al. | 705/1 |
| 6,629,148 B1* | 9/2003 | Ahmed et al. | 709/238 |
| 6,704,282 B1* | 3/2004 | Sun et al. | 370/237 |
| 6,708,218 B1* | 3/2004 | Ellington et al. | 709/236 |
| 6,738,362 B1* | 5/2004 | Xu et al. | 370/329 |
| 6,859,835 B1* | 2/2005 | Hipp | 709/227 |
| 6,891,837 B1* | 5/2005 | Hipp et al. | 370/397 |
| 6,915,325 B1* | 7/2005 | Lee et al. | 709/202 |
| 6,915,345 B1* | 7/2005 | Tummala et al. | 709/225 |
| 6,952,728 B1* | 10/2005 | Alles et al. | 709/224 |
| 6,959,341 B1* | 10/2005 | Leung | 709/250 |
| 6,970,459 B1* | 11/2005 | Meier | 370/389 |
| 6,970,902 B1* | 11/2005 | Moon | 709/201 |
| 6,973,057 B1* | 12/2005 | Forslow | 370/328 |
| 6,977,938 B2* | 12/2005 | Alriksson et al. | 370/401 |
| 6,978,308 B2* | 12/2005 | Boden et al. | 709/229 |
| 6,985,464 B2* | 1/2006 | Harper et al. | 370/331 |
| 6,992,994 B2* | 1/2006 | Das et al. | 370/328 |
| 6,992,995 B2* | 1/2006 | Agrawal et al. | 370/328 |
| 7,020,084 B1* | 3/2006 | Tanaka et al. | 370/235 |
| 7,028,183 B2* | 4/2006 | Simon et al. | 713/168 |
| 7,061,896 B2* | 6/2006 | Jabbari et al. | 370/338 |
| 7,099,475 B2* | 8/2006 | Huff et al. | 380/270 |
| 7,110,375 B2* | 9/2006 | Khalil et al. | 370/331 |
| 7,158,492 B2* | 1/2007 | Haverinen | 370/328 |
| 7,177,901 B1* | 2/2007 | Dutta | 709/203 |
| 7,210,147 B1* | 4/2007 | Hipp et al. | 719/312 |
| 7,225,236 B1* | 5/2007 | Puthiyandyil et al. | 709/218 |
| 2002/0041568 A1* | 4/2002 | Bender | 370/238 |
| 2002/0046277 A1* | 4/2002 | Barna et al. | 709/224 |
| 2002/0059114 A1 | 5/2002 | Cockrill et al. | 705/27 |
| 2002/0080752 A1 | 6/2002 | Johansson et al. | 370/338 |
| 2003/0056002 A1* | 3/2003 | Trethewey | 709/238 |
| 2003/0158913 A1* | 8/2003 | Agnoli et al. | 709/219 |
| 2003/0229697 A1* | 12/2003 | Borella | 709/226 |
| 2003/0235168 A1* | 12/2003 | Sharma et al. | 370/338 |
| 2004/0152439 A1* | 8/2004 | Kimura et al. | 455/403 |
| 2005/0041650 A1* | 2/2005 | O'Neill | 370/355 |

FOREIGN PATENT DOCUMENTS

| | | |
|---|---|---|
| WO | WO 98/26381 | 6/1998 |
| WO | WO 99/31610 | 6/1999 |
| WO | WO 01/06734 A1 | 1/2001 |

OTHER PUBLICATIONS

State Intellectual Property Office of the People's Republic of China, Text of the Second Office Action for Application No. 03816139.7, 1 page, Feb. 9, 2009.

The Patent Office of the People's Republic of China, State Intellectual Property Office of the People's Republic of China, Text of the Third Office Action for Application No. 03816139.7, Chinese Associate's transmittal letter to Baker Botts LLP dated Jul. 16, 2009, 11 pages.

The Patent Office of the People's Republic of China, State Intellectual Property Office of the People's Republic of China, Text of the Fourth Office Action for Application No. 03816139.7, Chinese Associate's transmittal letter to Baker Botts LLP dated Aug. 27, 2010, 22 pages.

Canadian Intellectual Property Office, Requisition for Application No. 2,490,689, Canadian Associate's transmittal letter to Baker Botts LLP dated Jan. 20, 2011, 3 pages.

The Patent Office of the People's Republic of China, Rejection Decision and Text of the Rejected Decision, Application No. 03816139.7, dated Jan. 26, 2011, forwarded by foreign associate to Baker Botts on Mar. 3, 2011; 22 pages.

* cited by examiner

SYSTEM AND METHOD FOR COMMUNICATING IN A LOADBALANCING ENVIRONMENT

TECHNICAL FIELD OF THE INVENTION

This invention relates in general to communications and more particularly to a system and method for communicating in a loadbalancing environment.

BACKGROUND OF THE INVENTION

Networking architectures are growing increasingly complex in communications environments. In addition, the increase of clients or end users wishing to communicate in a network environment have caused many networking architectures and systems to respond by adding elements to accommodate the increase in network traffic. Communication tunnels may be used in order to establish or to gain access to a network, whereby an end user or a client may initiate the corresponding tunneling protocol by invoking a central location or a single network node. Such central locations may be obligated to execute an excessive number of tasks that overburden or overtax the central location.

In addition, the unreasonable delegation of a disproportionate number of duties may decrease throughput, thereby inhibiting the flow of network traffic because of the robust communications propagating through the network. These strains on the central location not only operate to slow network traffic, but such reliance on a single central node in a network may create severe problems in situations where the central node fails or is otherwise unable to perform all of its assigned duties. In egregious cases, network communications associated with the central location may be lost and unrecoverable when the central location is overwhelmed with data.

SUMMARY OF THE INVENTION

From the foregoing, it may be appreciated by those skilled in the art that a need has arisen for an improved communications approach that provides for a reduction in the burden on a loadbalancer associated with communications between two endpoints. In accordance with one embodiment of the present invention, a system and method for establishing a network communication in a loadbalancing environment are provided that substantially eliminate or greatly reduce disadvantages and problems associated with conventional loadbalancing techniques.

According to one embodiment of the present invention, there is provided a method for communicating in a loadbalancing environment that includes receiving a request packet from a network access server (NAS) to initiate a communication session. The request packet is then communicated to a tunneling protocol network server (TPNS) and a response packet is received in response to the request packet. The response packet establishes a tunnel that facilitates the communication session and that includes an identification element associated with the TPNS such that a data transfer associated with the communication session is executed between the NAS and the TPNS.

Certain embodiments of the present invention may provide a number of technical advantages. For example, according to one embodiment of the present invention a communications approach is provided that allows a loadbalancer to only be actively involved in the initiation of a communication session. This reduction in responsibility for the loadbalancer operates to increase throughput as two points or nodes communicate more directly instead of having to direct all information through the loadbalancer for processing. This may further reduce the number of central processing unit (CPU) cycles, which may be intensive and require additional work to be performed by the loadbalancer. Accordingly, the loadbalancer may be relegated to simple information transfer or packet switching (generally not involving a modification of address information). The removal of the loadbalancer from the data transfer interaction between two nodes may further alleviate responsibilities designated for the loadbalancer such that more robust network traffic may be accommodated in the network.

Yet another technical advantage of one embodiment of the present invention is also a result of the removal of the loadbalancer from data transfer traffic. The decreased reliance on the loadbalancer operates to better allocate memory resources because information per-tunnel state is no longer maintained by the loadbalancer. In addition, the decreased dependency on the loadbalancer allows for improved failover characteristics whereby, if the loadbalancer would become dysfunctional or non-operational, associated communications sessions would not be lost. The continued operation of existing communication tunnels may be preserved in accordance with the teachings of the present invention by relegating the loadbalancer to tasks involving only the initiation of the communications session. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
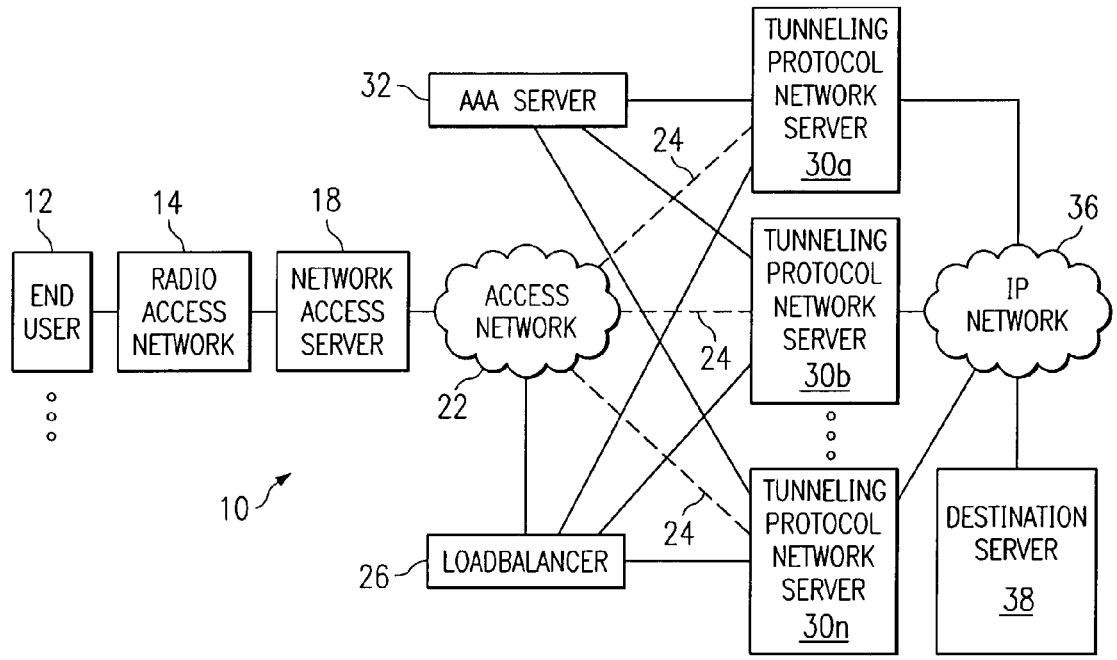
FIG. 1 is a simplified block diagram of a system for communicating in a loadbalancing environment in accordance with one embodiment of the present invention.

FIG. 1 is a simplified block diagram illustrating a communication system 10 for communicating data in a loadbalancing environment. Communication system 10 includes an end user 12, a radio access network (RAN) 14, a network access server (NAS) 18, and an access network 22. Additionally, communication system 10 includes a loadbalancer 26, multiple tunneling protocol network servers (TPNSs) 30a-n, an authentication, authorization, and accounting (AAA) server 32, an internet protocol (IP) network 36, and a destination server 38.

In accordance with the teachings of the present invention, communication system 10 operates to alleviate the responsibilities associated with loadbalancer 26 in providing optimal communications between end user 12 and IP network 36. Two stages generally exist in communications flows that involve end user 12. A first stage relates generally to initiation whereby a communication session may be prompted by end user 12. A second stage relates generally to the establishment of the communication session or link with corresponding data transfer. The initiation stage of a communication session generally requires an invocation of loadbalancer 26. During this stage, a create request and a suitable response may be generated within communication system 10.

After the communication session is initiated, loadbalancer 26 may be removed from the communications pathway allowing a more direct data transfer between end user 12 and IP network 36 via access network 22. Loadbalancer 26 operates to only be involved in initiating the communication session in accordance with the teachings of the present invention, whereby loadbalancer 26 operates as a request broker for establishing communication tunnels. This reduces the number of required processing cycles and, additionally, preserves memory resources of loadbalancer 26 since it no longer needs to maintain per-tunnel state information. This implementation also provides for a better allocation of resources associated with loadbalancer 26.

Additionally, when this initiation and establishment protocol is implemented in communication system 10, loadbalancer 26 experiences a significant reduction in communications traffic. This in turn alleviates the burden placed on loadbalancer 26 and offers increased throughput and decreased reliance on a central location (i.e. loadbalancer 26). This feature further provides the opportunity for loadbalancer 26 to be isolated from extensive central processing unit (CPU) cycles that may be intensive and require substantial work to be performed by loadbalancer 26. This technique also allows loadbalancer 26 to participate in only simple information transfers or data packet switching without requiring loadbalancer 26 to modify addressing information or to process data passing therethrough. With the reduced responsibilities of loadbalancer 26, communication system 10 is able to accommodate more robust communications traffic and allow for an enhanced and more efficient communications environment.

End user 12 is a client or a customer wishing to initiate a communication in communication system 10 via access network 22. End user 12 may be inclusive of devices used to initiate a communication, such as a computer, a personal digital assistant (PDA), a laptop or electronic notebook, a telephone, or any other device, component, element, or object capable of initiating voice or data exchanges within communication system 10. End user 12 may also be inclusive of a suitable interface to the human user, such as a microphone, a display, or a keyboard or other terminal equipment (such as an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used in this document, refers to any type of numeric, voice, or script data, or any type of source or object code, or any other suitable information in any appropriate format that may be communicated from one point to another.

RAN 14 is a communications interface between end user 12 and NAS 18. RAN 14 may comprise a base transceiver station and a base station. The communications interface provided by RAN 14 allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and NAS 18. Other types of communications interfaces may be used for a desired network design.

NAS 18 is an element that provides access to any network (such as access network 22) for end user 12. NAS 18 may be used with a transmission control protocol/internet protocol (TCP/IP) network, including serial terminal access controllers, modem pools or stacks, integrated services digital network (ISDN) routers, or multi-function access controllers where appropriate. NAS 18 may also be used in combination with any element that provides switched service connections, point-to-point (PPP) serial IP protocols, or user authentication functions according to particular needs. NAS 18 may represent a tunnel initiator for communication system 10, whereby TPNSs 30*a-n* represent multiple tunnel terminators or contact nodes for establishing a communication session. NAS 18 may also support serial line internet protocol (SLIP), allowing NAS 18 to establish and to manage the individual communications links to remote sites across a switched service. NAS 18 may properly authenticate end user 12 by invoking AAA server 32 before allowing access to a network or to another server. NAS 18 may also store one or more identification elements or passwords that may be used in authenticating end user 12.

In a particular embodiment of the present invention, the communication protocol implemented by NAS 18 is RADIUS. NAS 18 may alternatively use terminal access controller access control system (TACACS), or DIAMETER, or any other suitable communications protocol in order to provide an authentication functionality to end user 12. In operation, NAS 18 operates to bring up a communication session with end user 12. NAS 18 may also provide accounting or authorization functions on behalf of end user 12 and perform IP address management for end user 12 where appropriate. NAS 18 may terminate PPP connections or communication links and may generally correspond to the communication protocol implemented by access network 22.

In an alternative embodiment of the present invention, NAS 18 may be removed from communication system 10 or substituted with any element capable of performing one or more of the functions of NAS 18. NAS 18 could be removed in various applications, such as with use in a cable implementation via PPP over Ethernet (PPPOE), where data may be tunneled over or across the PPPOE connection. The data may be communicated to an element like NAS 18 that provides an interface between access network 22 and end user 12. Alternatively, IP packets (not tunneled in PPPOE) may be routed from the time they arrive on the network and directly sent to an element that receives the data. Additionally, some or all of the functions of NAS 18 may be provided in access network 22. Accordingly, access network 22 may be configured in any appropriate manner in order to provide PPP or RADIUS-type mechanisms or features, such as authentication, authorization, accounting, content filtering, and priority.

Access network 22 represents a series of points or nodes of interconnected communication paths for receiving and transmitting packets of information that propagate through communication system 10. Access network 22 offers a communicative interface between end user 12 and IP network 36 and may provide a PPP connection in certain embodiments Access network 22 may implement any communications protocol such as dial-up, cable, digital subscriber line (DSL), fiberoptic, radio, local area network (LAN), wireless local area network (WLAN), metropolitan area network (MAN), wide area network (WAN), or any other suitable communications architecture or platform that allows packet communications or tunneling to (or through) access network 22.

Access network 22 may also be inclusive of RAN 14, where appropriate, or a hub that allows end user 12 to log onto or otherwise access a network.

Access network 22 may also include authentication features provided to end user 12. In a particular embodiment, access network 22 represents a packet data network (PDN). However, access network 22 may be any other suitable network where appropriate and according to particular needs. Access network 22 implements a TCP/IP communications language architecture in a particular embodiment of the present invention. However, access network 22 may alternatively implement any other suitable communications protocol for transmitting and receiving data packets within communication system 10.

Loadbalancer 26 is an element or a device that receives requests and then distributes those requests to the next available server or node. The available server or node may be any computer or device on a network that manages network resources or that processes data. Loadbalancer 25 divides the tasks of processing requests between two or more available servers or nodes so that end users are served more efficiently. Loadbalancer 26 may be implemented with hardware, software, (or a combination of both) or any component, device, element, or object that suitably manages information traffic in a network environment. Any of the operations of NAS 18 or TPNSs 30a-n (or the actual elements themselves) may be provided in loadbalancer 26 where appropriate and in accordance with particular needs.

TPNSs 30a-n each represent a server program or element that may be provided to address secure services provided to end user 12. TPNSs 30a-n may each provide an interface between IP network 36 and loadbalancer 26. TPNSs 30a-n may also provide a more direct connection to access network 22 (illustrated as a set of dashed lines 24 in FIG. 1) such that the responsibilities relegated to loadbalancer 26 are significantly reduced. TPNSs 30a-n may represent a contact node or tunnel terminator provided to communication system 10. In a particular embodiment, TPNSs 30a-n offer secure services within communication system 10. In such a case, a corresponding local access concentrator (LAC) element may be provided in any one or more of the elements within communications system 10. Alternatively, TPNSs 30a-n may facilitate non-secure services or communications involving end user 12 where appropriate and according to particular needs. It is critical to note that TPNSs 30a-n may be any suitable component, hardware, software, object, or element that offers a communications node for end user 12 to initiate contact therewith. TPNSs 30a-n represent points of great flexibility in that they may be any suitable element that facilitates communications via loadbalancer 26.

AAA server 32 is a server program that handles requests by end user 12 for access to networking resources. Networking resources refers to any device, component, or element that provides some operation or functionality to end user 12 communicating in communication system 10. For a corresponding network, AAA server 32 may also provide authentication, authorization, and accounting services and management. Authorization generally refers to the process of giving end user 12 permission to do or to access something. In multi-user computer systems, a system administrator may define for the system which end users are allowed access to given data in the system and, further, what privileges are provided for end user 12. Once end user 12 has logged into a network, such as IP network 36 or access network 22, the network may wish to identify what resources end user 12 is given during the communication session. Thus, authorization within communication system 10 may include both a preliminary setting of permissions by a system administrator and the verification of the permission values when end user 12 attempts access. Authentication generally refers to the process of determining whether end user 12 is in fact who or what it is declared to be. In the case of private or public computer networks, authentication may be commonly done through the use of unique identification elements (such as an MSISDN) or log-on passwords. Knowledge of the password offers a presumption that a given end user is authentic. Accounting generally refers to tracking usage for each end user or each network and may additionally include trafficking information or data relating to other information flows within communication system 10 or within a particular sub-network.

AAA server 32 may receive the IP address and other parameters from any suitable source, such as a client aware element or, alternatively, from a dynamic host configuration protocol (DHCP) server or a domain name system (DNS) database element, in order to direct data to be communicated to end user 12. AAA server 32 may include any suitable hardware, software, component, or element that operates to receive data associated with end user 12 and provides corresponding AAA related functions to network components within communication system 10. Authorization and IP address management may be retrieved by AAA server 32 from a selected TPNSs 30a-n, where appropriate, and may be provided to address secure services for end user 12. The assigned IP address may be a private or a routable IP address. On assignment of the IP address, the DHCP server may perform update procedures for updating the assigned IP address and leasing parameters for end user 12 in accordance with particular needs of the network.

IP network 36 represents a series of points or nodes of interconnected communication paths for receiving and transmitting packets of information that propagate through communication system 10. IP network 36 offers a communicative interface between destination server 38 and a selected TPNS 30a-n and may be any LAN, WLAN, MAN, WAN, or any other appropriate architecture or system that facilitates communications in a network environment. IP network 36 implements a TCP/IP communication language protocol in a particular embodiment of the present invention. However, IP network 36 may alternatively implement any other suitable communication protocol for transmitting and receiving data packets within communication system 10.

Destination server 38 represents a program that, using the client/server model and the world wide web's HTTP, serves the files that form web pages to web users. Destination server 38 may be provided as part of a larger package of internet and intranet-related programs for serving e-mail, downloading requests for file transfer protocol (FTP) files, building and publishing web pages, or any other suitable network operations according to particular needs. Alternatively, destination server 38 may be any suitable database or location in a network environment sought to be contacted, queried, or otherwise accessed by end user 12.

Figure 2:
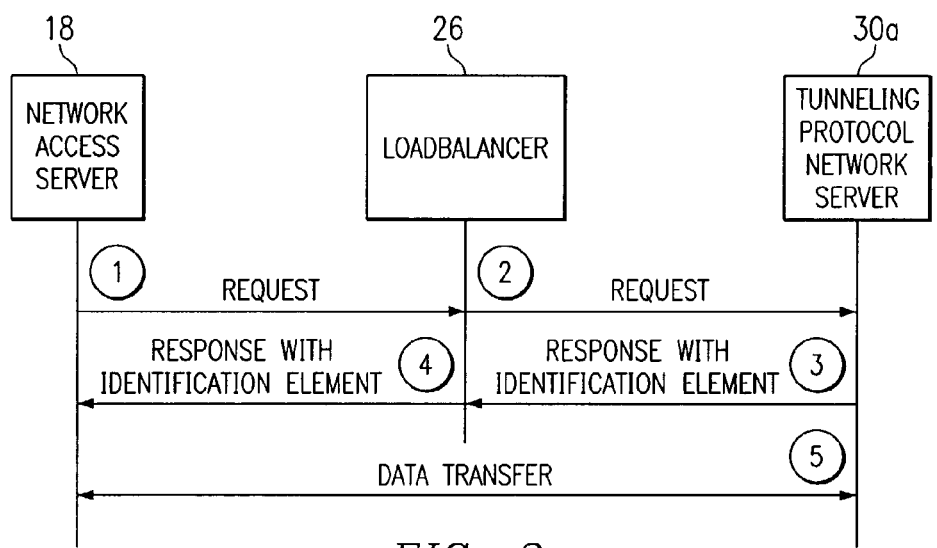
FIG. 2 is a simplified state diagram of the operation of the system for communicating in a loadbalancing environment.

FIG. 2 is a simplified state diagram of the operation of communication system 10 in accordance with one embodiment of the present invention. In operation, end user 12 initiates a connection to NAS 18 (possibly via RAN 14) which may include the use of PPP sessions and providing network access to end user 12. The PPP link could be a public switched telephone network (PSTN) connection, a provisioned asynchronous transfer mode (ATM) permanent virtual circuit (PVC) connection or a switched virtual circuit (SVC), wherein the identification element includes an internet protocol (IP) address associated with the corresponding TPNS such that the NAS may communicate the data transfer to the TPNS connection), segments of the communication spectrum used for data channels obtained over a mobile wireless RAN, or any other suitable communications link according to particular needs. In response to this initiation, NAS 18 establishes a tunnel to a selected TPNS 30a-n via access network 22 and through loadbalancer 26. This is illustrated by steps 1 and 2 of FIG. 2. This tunnel establishment phase allows a selected TPNS 30a-n to authenticate and authorize end user 12 in a central location without burdening multiple NAS 18 structures.

After end user 12 is authorized by a selected TPNS 30a-n, access may be granted to IP network 36 by the selected TPNS 30a-n to end user 12. The selected TPNS 30a-n may access AAA server 32 in granting permissions to communicate with IP network 36. In accordance with the teachings of the present invention, loadbalancer 26 may be only involved in tunnel establishment and generally not implicated in the subsequent data transfer. Communications protocols may be provided with the ability to assign or designate data transfer locations in the response signal generated during tunnel establishment illustrated by steps 3 and 4 of FIG. 2. An identification element (such as an IP address, a data segment associated with the location of the selected TPNS 30a-n, or any other suitable element that operates to distinguish information routing or information propagation in a network) may be inserted into the response packet such that more direct communications may take place between NAS 18 and the selected TPNS 30a-n. Accordingly, for such protocols, loadbalancer 26 is only involved in the tunneling setup phase because NAS 18 will send data transfer messages directly to the selected TPNS 30a-n and bypass loadbalancer 26 as illustrated by step 5 of FIG. 2. Using this method of loadbalancing for these tunnels, loadbalancer 26 may effectively step out of the way of data flows on the tunnel. This provides for improved scalability by limiting the packet inspection or modification duties of loadbalancer 26.

Figure 3:
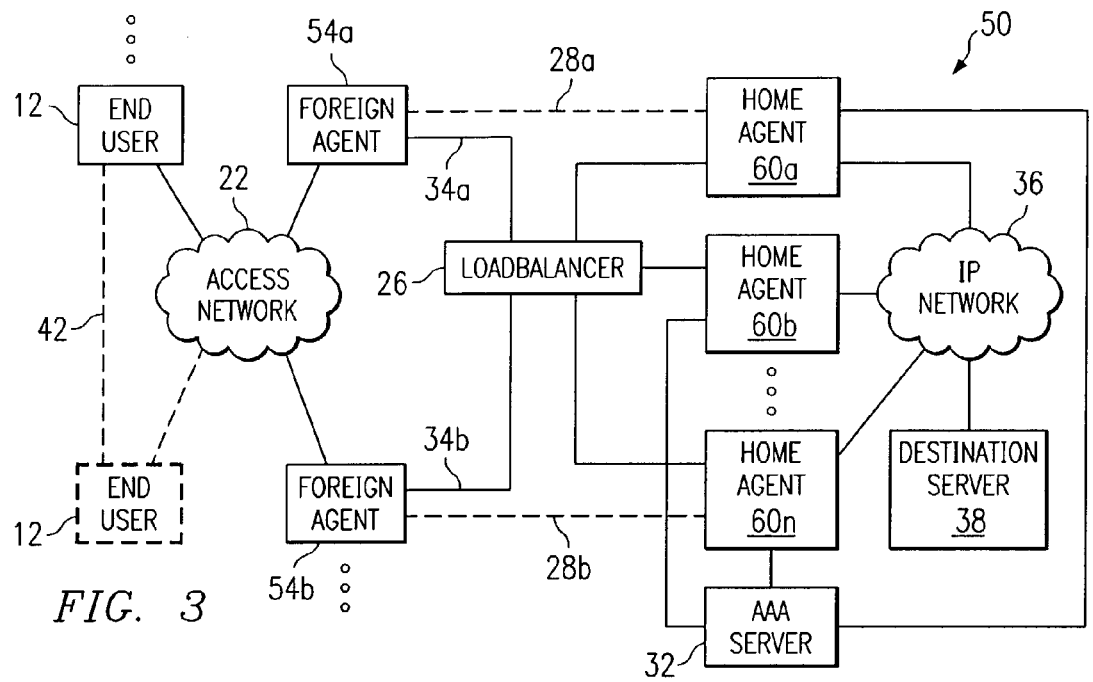
FIG. 3 is a simplified block diagram of a system for communicating in a loadbalancing environment in accordance with another embodiment of the present invention.

FIG. 3 is a simplified block diagram of a system for communicating in a loadbalancing environment in accordance with another example embodiment of the present invention. FIG. 3 illustrates an alternative communications platform for mobile IP communications in which multiple foreign agents 54a-n are included in the system, as well as multiple home agents 60a-n. These elements cooperate in order to reduce the burden on loadbalancer 26 such that loadbalancer 26 is only involved in the initiation of a communications session involving end user 12.

Home agents 60a-n each represent a mobile IP element or node that allows end user 12 to communicate in a network environment. Each home agent 60a-n provides an interface between loadbalancer 26 and IP network 36 and communicates with loadbalancer 26 primarily during initiation of a communication session involving end user 12. Home agents 60a-n may be provisioned in any suitable location of a network. Home agents 60a-n may cooperate with a DHCP server during mobile IP registration in order to assign an IP address to end user 12. User authentication and IP address allocation may be performed during mobile IP registration with a selected home agent 60a-n (this is slightly different from the PPP establishment phase for a simple IP service scenario). On authentication, end user 12 may be assigned an IP address by the selected home agent 60a-n and a corresponding network registrar where appropriate. The assigned IP address may be a private or a routable IP address in accordance with particular needs.

In operation, where mobile IP services are being offered to end user 12, a home network may perform user authentication and IP address allocation. User authentication and IP address allocation may be performed during mobile IP registration with the selected home agent 60a-n. Mobile IP enables a host to be identified by a single IP address even while end user 12 physically moves its point of attachment from one network (or point in the network) to another. This feature allows transparent forwarding of data packets to end user 12. Movement from one point of attachment to another is seamlessly achieved without requiring the intervention of end user 12. Thus, mobile IP servicing in the context of communication system 10 provides ubiquitous connectivity for users regardless of their presence in their respective home enterprise networks.

Foreign agents 54a-n are routing elements or entities that facilitate communications initiated by end user 12. Elements or devices associated with end user 12 may register their presence at a remote location through foreign agents 54a-n. Any one of foreign agents 54a-n may communicate with selected home agents 60a-n such that data packets may be appropriately forwarded to their proper destination. The use of foreign agents 54a-n allows end user 12 to freely roam from one network coverage area to another while maintaining a communication session and retaining its identity (as illustrated in the example provided below). Foreign agents 54a-n may be positioned in any suitable location within or external to communication system 10 according to particular needs. Foreign agents 54a-n and home agents 60a-n may represent tunnel initiators or tunnel terminators being provided to communication system 10. In other embodiments, these elements may be substituted with any element that operates to initiate or to provide a contact for communication sessions in a network environment.

In operation of an example embodiment, end user 12 may establish a connection to a selected one of foreign agents 54a-n. End user 12 may have roamed into an area covered by foreign agent 54a or 54b (as illustrated by a hatched line 42 in FIG. 3 showing movement of end user 12 while maintaining a connectivity to access network 22). When end user 12 roams from one foreign agent to another, the associated IP address of end user 12 (or his/her identity) does not require a change from the perspective of other elements in the network. This may be generally accomplished by storing the unique identity or IP address with a selected home agent 60a-n.

In the case of mobile IP communications, a mobile IP tunnel may then be established between foreign agent 54a and loadbalancer 26 using a request message during the tunnel establishment phase. This is illustrated in FIG. 3 as a communications pathway (or link) 34a. Loadbalancer 26 may then forward the message to a selected home agent 60a-n. The selected home agent 60a-n may respond to receiving the request by positioning an identification element (such as its associated IP address) in the response Alternatively, any other element in communication system 10 may position the identification element in the response.

After the establishment phase is complete, traffic may be sent directly to a selected home agent 60a-n from foreign agent 54a or 54b if end user 12 has roamed. The communication between foreign agent 54b and loadbalancer 26 is illustrated by a communications pathway (or link) 34b. With the initiation step complete, destination server 38 may send communications or data packets through the selected home agent 60a-n and to a selected foreign agent 54a or 54b. This pattern illustrates asymmetrical routing, whereby loadbalancer 26 is implicated in the establishment of a communication session or tunnel and then removed from the communication flow during data transfer. This feature minimizes the involvement of loadbalancer 26 and provides for more direct communications between foreign agents 54a and 54b and selected home agents 60a-n, as illustrated by a set of dashed lines 28a and 28b in FIG. 3.

In cases where end user 12 roams from foreign agent 54a to foreign agent 54b, foreign agent 54b may establish a mobile IP tunnel (in the case of mobile IP communications) to the selected home agent 60a-n. The selected home agent 60a-n may then respond by communicating requested data from destination server 38 to foreign agent 54b in a seamless or transparent fashion. This seamless handover or handoff may be executed such that the communication session is uninterrupted and properly maintained during all data exchanges involving end user 12.

Figure 4:
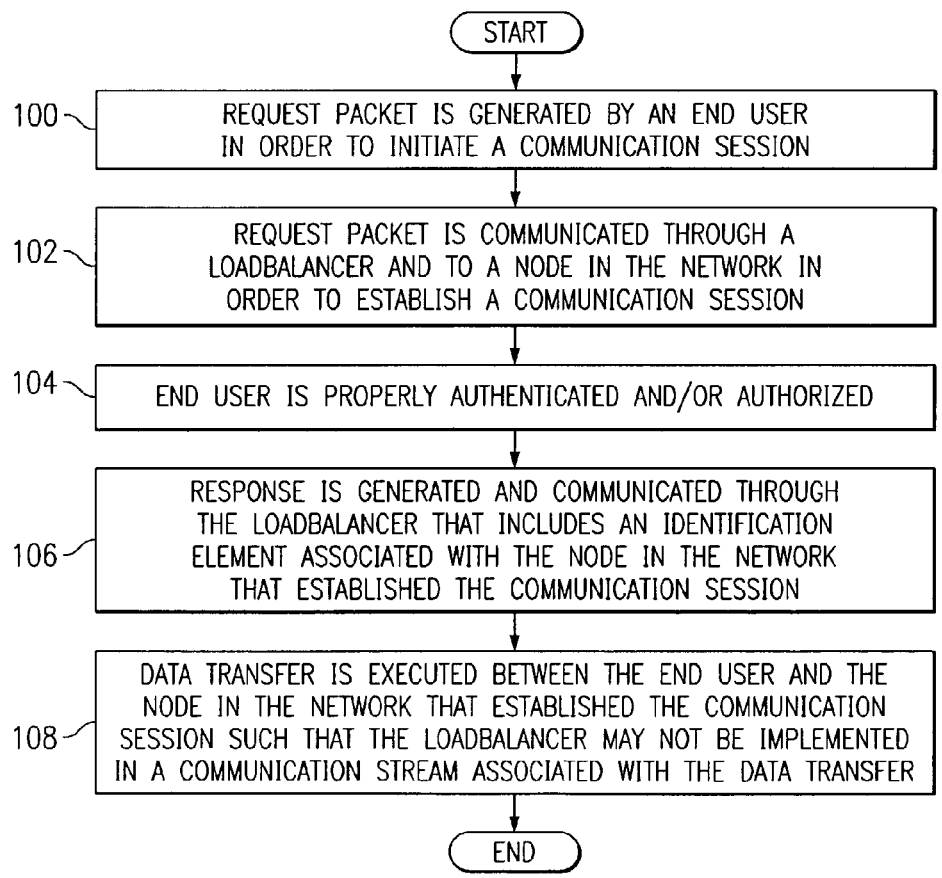
FIG. 4 is a flowchart illustrating a series of example steps associated with a method for communicating in a loadbalancing environment.

FIG. 4 is a flowchart illustrating a series of steps associated with a method for communicating in a loadbalancing environment. The method begins at step 100 where a request packet is generated by end user 12 in order to initiate a communication session or tunnel. At step 102, the request packet is communicated through loadbalancer 26 and to a node in the network (such as a selected home agent 60a-n or a selected TPNS 30a-n) in order to establish a communication session or tunnel. At step 104, end user 12 may be properly authenticated and/or authorized by invoking an element such as AAA server 32.

At step 106, a response is generated and communicated through loadbalancer 26 that includes an identification element (such as an IP address or destination information associated with the node in the network that established the communication session, e.g. the TPNS or the home agent). At step 108, data transfer may be executed between end user 12 and the node in the network that established the communication session such that loadbalancer 26 may not be implemented in a communication session or stream associated with the data transfer.

Some of the steps illustrated in FIG. 4 may be changed or deleted where appropriate and additional steps may also be added to the flowchart. These changes may be based on specific communications architectures or particular interfacing arrangements and configurations of associated elements and do not depart from the scope or the teachings of the present invention.

Although the present invention has been described in detail with reference to mobile IP communications (in conjunction with the use of home agents and foreign agents) and NAS 18 and TPNSs 30a-n, communication system 10 may be used for any tunneling protocol involving a redirection or handoff of communications in a network environment. Any suitable communications that involve the transitioning between an initialization state and a data transfer state may benefit from the teachings of the present invention. Mobile IP applications and TPNS communications have only been offered for purposes of teaching and should not be construed to limit the scope of the present invention in any way.

In addition, communication system 10 may be extended to any scenario in which end user 12 is provided with mobility (in the context of a wired or a wireless connection or coupling) and communicates with some type of access server (e.g. NAS 18, foreign agents 54a-n, etc.). End user 12 may be using a dedicated connection of some form, or using forms of multiple access protocols where appropriate. Access may be associated with PPP or alternatively with layer three protocol (for example IP) over an L2 layer in accordance with particular needs. Layer two tunneling protocol (L2TP) network servers may also be used in accordance with the teachings of the present invention. Such an embodiment would include any suitable tunnel terminators and/or tunnel initiators that may be operable to communicate with loadbalancer 26.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

Moreover, the present invention is not intended to be limited in any way by any statement in the specification that is not otherwise reflected in the appended claims. Various example embodiments have been shown and described, but the present invention is not limited to the embodiments offered. Accordingly, the scope of the present invention is intended to be limited solely by the scope of the claims that follow.

What is claimed is:

1. A method for communicating in a loadbalancing environment, the method comprising:
receiving, at a loadbalancer, a request packet from a network access server (NAS) requesting loadbalancing among a group of tunneling protocol network servers (TPNSs) distinct from the NAS in order to facilitate a communication session for an end user;
selecting a tunneling protocol network server (TPNS) from the group of tunneling protocol network servers distinct from the NAS by the loadbalancer to balance a processing load among the group of tunneling protocol network servers;
communicating, by the loadbalancer, the request packet to the TPNS;
receiving, at the loadbalancer, a first response packet comprising an identification element associated with the TPNS in response to the request packet, the first response packet establishing a tunnel comprising the NAS, the loadbalancer, and the TPNS that facilitates the communication session;
communicating, from the loadbalancer, a second response packet to the NAS in response to receiving the first response packet;
wherein data transfers from the NAS to the TPNS and data transfers from the TPNS to the NAS occurring subsequent to the establishment of the tunnel associated with the communication session are executed without going through the loadbalancer; and
wherein the loadbalancer does not maintain state information regarding the communication session subsequent to the establishment of the tunnel associated with the communication session.

2. The method of claim 1, further comprising:
authenticating the end user associated with the communication session before establishing the tunnel that facilitates the communication session.

3. The method of claim 1, wherein the identification element includes an internet protocol (IP) address associated with the TPNS such that the NAS may communicate the data transfer to the TPNS.

4. The method of claim 1, further comprising:
providing a communicative interface between the NAS and the TPNS that uses an access network.

5. The method of claim 1, wherein the request packet is received from the end user through a radio access network (RAN) and the NAS.

6. The method of claim 1, further comprising:
receiving, at a second network access server (NAS-2) serving a different coverage area than the NAS, packets for the communication session from the end user;
sending, by the NAS-2, the packets from the end user to the NAS; and sending, by the NAS, the packets to the TPNS selected by the loadbalancer without going through the loadbalancer.

7. Software for communicating in a loadbalancing environment that is embodied in non-transitory computer readable media and operable to:
receive, at a loadbalancer, a request packet from a network access server (NAS) requesting loadbalancing among a group of tunneling protocol network servers (TPNSs) distinct from the NAS in order to facilitate a communication session for an end user;
select a tunneling protocol network server (TPNS) from the group of tunneling protocol network servers distinct from the NAS by the loadbalancer to balance a processing load among the group of tunneling protocol network servers;
communicate, by the loadbalancer, the request packet to the TPNS;
receive, at the loadbalancer, a first response packet comprising an identification element associated with the TPNS in response to the request packet, the first response packet establishing a tunnel comprising the NAS, the loadbalancer, and the TPNS that facilitates the communication session; and
communicate, from the loadbalancer, a second response packet to the NAS in response to receiving the first response packet;
wherein data transfers from the NAS to the TPNS and data transfers from the TPNS to the NAS occurring subsequent to the establishment of the tunnel associated with the communication session are executed without going through the loadbalancer; and
wherein the loadbalancer does not maintain state information regarding the communication session subsequent to the establishment of the tunnel associated with the communication session.

8. The software of claim 7, further operable to:
authenticate the end user associated with the communication session before establishing the tunnel that facilitates the communication session.

9. The software of claim 7, wherein the identification element includes an internet protocol (IP) address associated with the TPNS such that the NAS may communicate the data transfer to the TPNS.

10. The software of claim 7, further operable to: provide a communicative interface between the NAS and the TPNS that uses an access network.

11. The software of claim 7 wherein the request packet is received from the end user through a radio access network (RAN) and the NAS.

12. A system for communicating in a loadbalancing environment, comprising:
a network access server (NAS) operable to send a request packet to request loadbalancing among a group of tunneling protocol network servers (TPNSs) distinct from the NAS in order to facilitate a communication session for an end user;
a first interface to the NAS;
a second interface to a group of tunneling protocol network servers; and
a loadbalancer comprising at least one processor operable to:
receive a request packet from the first interface;
select a tunneling protocol network server (TPNS) from the group of tunneling protocol network servers distinct from the NAS to balance a processing load among the group of tunneling protocol network servers;
communicate the request packet to the TPNS through the second interface;
receive a first response packet through the second interface comprising an identification element associated with the TPNS in response to the request packet, the response packet establishing a tunnel comprising the NAS, the loadbalancer, and the TPNS that facilitates the communication; and
communicate a second response packet to the NAS in response to receiving the first response packet;
wherein data transfers from the NAS to the TPNS and data transfers from the TPNS to the NAS occurring subsequent to the establishment of the tunnel associated with the communication session are executed without going through the loadbalancer; and
wherein the loadbalancer does not maintain state information regarding the communication session subsequent to the establishment of the tunnel associated with the communication session.

13. The system of claim 12, further comprising:
an authentication, authorization, and accounting (AAA) server operable to authenticate the end user associated with the communication session before establishing the tunnel that facilitates the communication session.

14. The system of claim 12, wherein the identification element includes an internet protocol (IP) address associated with the TPNS such that the NAS may communicate the data transfer to the TPNS.

15. The system of claim 12, further comprising:
a communicative interface between the NAS and the TPNS that uses an access network.

16. The system of claim 12 wherein the request packet is received from the end user through a radio access network (RAN) and the NAS.

17. An apparatus for communicating in a loadbalancing environment, comprising:
a loadbalancer comprising at least one processor operable to:
receive a request packet from a network access server (NAS) that requests loadbalancing among a group of tunneling protocol network servers (TPNSs) distinct from the NAS in order to facilitate a communication session for an end user;
select a tunneling protocol network server (TPNS) from the group of tunneling protocol network servers distinct from the NAS to balance a processing load among the group of tunneling protocol network servers;
communicate the request packet to the TPNS;
receive a first response packet comprising an identification element associated with the TPNS from the TPNS in response to the request packet, the response packet establishing a tunnel comprising the NAS, the loadbalancer, and the TPNS that facilitates the communication session; and
communicate a second response packet to the NAS in response to receiving the first response packet;
wherein data transfers from the NAS to the TPNS and data transfers from the TPNS to the NAS occurring subsequent to the establishment of the tunnel associated with the communication session are executed without going through the loadbalancer; and
wherein the loadbalancer does not maintain state information regarding the communication session subsequent to the establishment of the tunnel associated with the communication session.

\* \* \* \* \*